United States Patent [19]

Geist et al.

[11] Patent Number: 5,077,722
[45] Date of Patent: Dec. 31, 1991

[54] DISK DRIVE INSERTION AND REMOVAL INTERLOCK

[75] Inventors: Edward D. Geist; Arthur T. Kimmel; Gregory G. Schober, all of Dallas; Trenton A. Ames, Plano; David B. Matthews, Red Oak; John W. Clark, Carrollton, all of Tex.

[73] Assignee: Convex Computer Corporation, Richardson, Tex.

[21] Appl. No.: 293,967

[22] Filed: Jan. 6, 1989

[51] Int. Cl.⁵ ............... G11B 33/02; G11B 27/00; H04B 1/08
[52] U.S. Cl. .................... 369/75.1; 360/137; 369/292; 455/347
[58] Field of Search ............. 369/75.1, 75.2; 360/98, 360/99; 455/347, 349; 312/221, 220, 219, 111, 107, 107.5, 108, 320

[56] References Cited

U.S. PATENT DOCUMENTS

| | | | |
|---|---|---|---|
| 2,771,523 | 11/1956 | Stoecklin et al. | 200/50 |
| 2,878,430 | 3/1959 | Stoecklin et al. | 317/113 |
| 3,131,012 | 4/1964 | Healy | 339/12 |
| 3,350,675 | 10/1967 | Misencik et al. | 339/12 |
| 3,959,823 | 5/1976 | Heidecker et al. | 360/99.04 |
| 4,236,190 | 11/1980 | Hollingsead et al. | 361/391 |
| 4,256,356 | 3/1981 | Roth | 312/320 |
| 4,298,239 | 11/1981 | Montalto et al. | 339/66 |
| 4,599,665 | 7/1986 | Yoshida | 360/105 |
| 4,614,389 | 9/1986 | Albert et al. | 339/45 |
| 4,633,350 | 12/1986 | Hanson | 369/75.1 |
| 4,682,833 | 7/1987 | Ferchau et al. | 439/377 |
| 4,698,024 | 10/1987 | Maxwell | 439/62 |
| 4,833,554 | 5/1989 | Dalziel et al. | 360/98.04 |

OTHER PUBLICATIONS

MDB Systems, Inc., "Data Shuttle 2000 Preliminary Data Sheet".
Plessey, "Modular Storage Sub-Systems".
Kierulff, "Emulex Removable Storage Subsystem", Oct. 1, 1987.

Primary Examiner—Stuart S. Levy
Assistant Examiner—Kenneth B. Wells
Attorney, Agent, or Firm—Richards, Medlock & Andrews

[57] ABSTRACT

An interlock for a disk drive unit having a handle and a camming arrangement responsive to pivotal movements for inserting and withdrawing the unit from a housing fixture. A solenoid is actuable to lock the handle when the unit is fully inserted. A sensor is adapted for sensing an interlock engagement between the solenoid armature and the handle. For removing the disk drive unit, a delay is interposed before retracting the solenoid armature to assure that the disk drive unit is fully stopped before the handle can be rotated for removal of the unit.

29 Claims, 2 Drawing Sheets

DISK DRIVE INSERTION AND REMOVAL INTERLOCK

TECHNICAL FIELD OF THE INVENTION

The present invention relates in general to disk drive units utilized with computer systems, and more particularly relates to fail-safe methods and apparatus for inserting and withdrawing disk drive units from electrical fixture housings.

BACKGROUND OF THE INVENTION

Disk drives are highly developed for storing massive amounts of data for high speed access by computerized systems. Depending upon the type and size of the computerized system, the disk drive units can be either integrally associated therewith, or may be removable. The removable type of disk drive units facilitates the mass storage of data thereon and the removal thereof for storing in a secure area. Such type of disk drive units are ideally suited for storing encrypted data, and the subsequent storage in vaults for security purposes. The portability of removable disk drives also enhances the use of the data stored thereon by different computer systems, in that such disk drive units can be written with a large amount of data on one computer system, removed therefrom, and transported and used with another computer system. The removable type of disk drive is constructed for easy and secure transport, and adapted for insertion into universal electrical fixture housings of many computerized systems for rapid storage or retrieval of data therefrom. U.S. Pat. No. 4,682,833 illustrates such a portable disk drive unit and a technique for providing proper alignment when inserted into a storage cabinet.

Disk drive units are inherently complicated in construction and operation, requiring highly sophisticated electrical circuits for the storage and retrieval of data from a magnetic disk medium, as well as sophisticated mechanical apparatus for quickly and reliably moving a read/write head over the magnetic medium to access desired storage locations. It can be appreciated that when dealing with expensive equipment, it is highly desirable to render such equipment less susceptible to damage, especially when human intervention is involved.

Portable or transportable disk drive units generally require special precautions in the removal thereof from the electrical fixtures. For example, the movable read/write head can be damaged if the high speed rotating disk is not completely stopped before the unit is removed from its electrical connectorized fixture. In addition, if the electrical connector of the disk drive unit is not fully engaged within the electrical fixtures, erroneous operation or failure of the unit can be experienced.

From the foregoing, it can be seen that a need exists for a fail-safe arrangement which maintains the disk drive unit locked to the electrical fixture until it is safe for removal therefrom. An additional need exists for a disk drive locking arrangement which is easily operable by an operator, and which senses when the disk drive unit is reliably locked within its electrical fixture.

SUMMARY OF THE INVENTION

In accordance with the present invention, a disk drive interlock and sensing arrangement is disclosed which eliminates or substantially reduces the disadvantages and shortcomings of the prior methods and apparatus. The locking arrangement according to the present invention comprises a U-shaped handle pivotally mounted to the disk drive unit. The handle includes a pair of spiral camming slots engageable with corresponding pins affixed to an electrical fixture housing so that when the disk drive unit is partially inserted into the housing, and when the handle is rotated, the unit is moved so that the electrical connections between the unit and the fixture are fully mated in an orderly manner. After full insertion of the disk drive unit is accomplished, a start button or switch associated with the unit is depressed to render the unit operable. A solenoid mounted to the disk drive unit is responsive to the actuation of the start switch, whereupon a solenoid armature is driven outwardly into engagement with the handle. The handle is thus prevented from being counter-rotated to maintain the unit inserted within the fixture housing.

An optical sensor mounted adjacent the solenoid armature senses the interlocking engagement of the armature within an aperture in the handle, and if proper, an electrical signal is transferred to the disk drive unit to render it fully operable. On the other hand, if the sensor does not sense the correct engagement of the solenoid armature within the handle aperture, an error indicator is activated to provide the operator with a visual indication that the unit has not been fully or properly inserted into the housing fixture.

The locking arrangement is made essentially fail-safe when removing the disk drive unit from the housing fixture by providing a time delay before the solenoid is deactivated such that removal of the disk drive unit can be effected. In removing such unit, a stop switch is depressed and the time delay circuit is activated so that the solenoid armature cannot become disengaged from the handle until lapse of such time period. In the preferred embodiment of the invention, a time delay of about 40 seconds is interposed such that the rotating disk of the unit can be completely stopped before the handle can be counter-rotated for removal of the disk drive unit from the housing fixture.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or functions throughout the views, and in which.

DETAILED DESCRIPTION OF THE INVENTION

Figure 1:
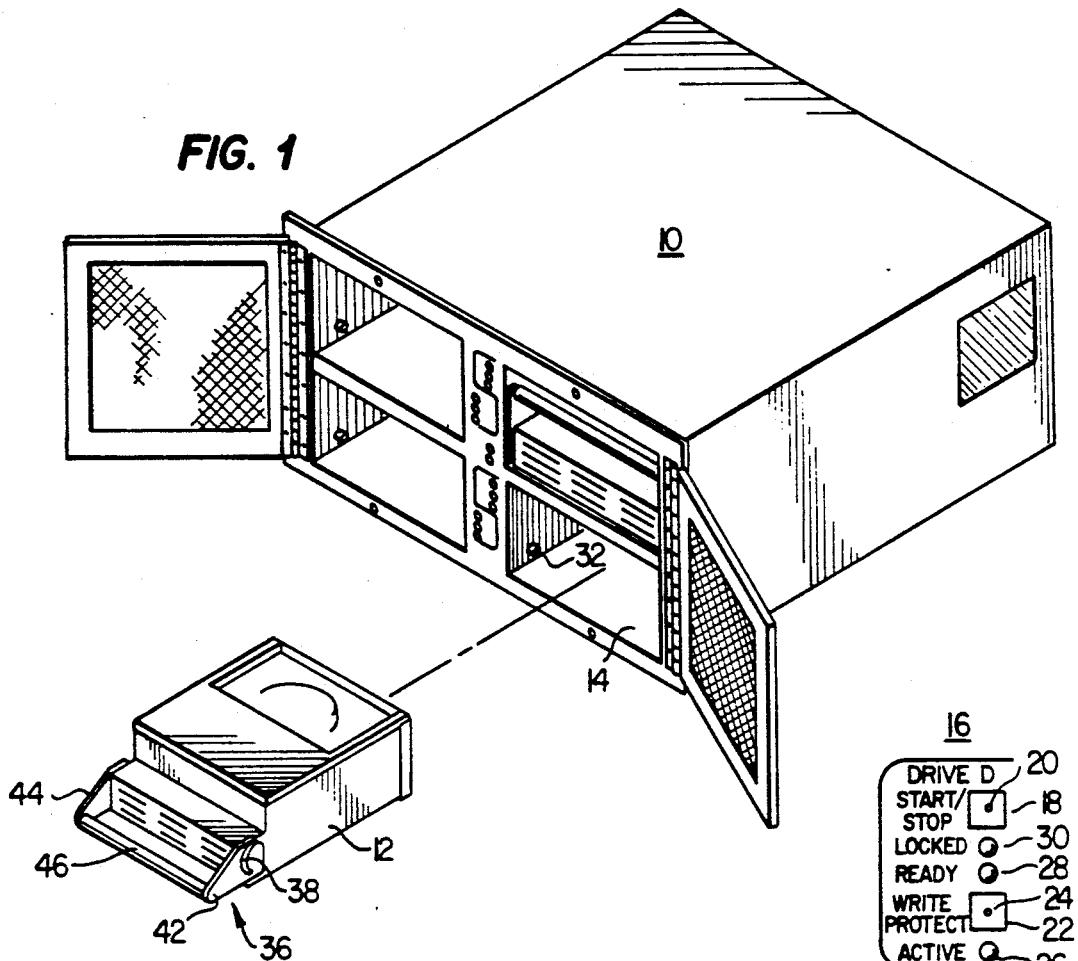
FIG. 1 is an isometric view of a disk drive unit of the invention shown removed from a housing fixture which can accommodate four such units.
Figure 1A:
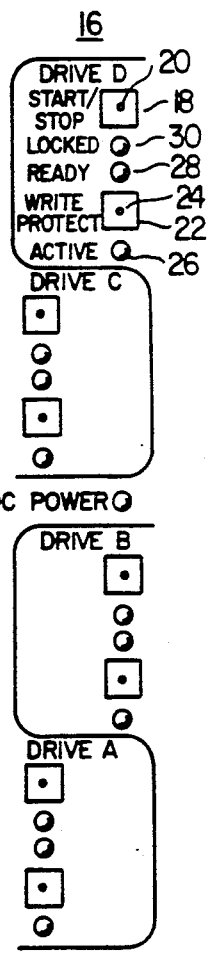
FIG. 1a is an enlarged view of the switch and indicator arrangement on the front panel of the disk drive housing.

With reference now to FIG. 1, there is illustrated a housing 10 for receiving one or more disk drive units, one shown by reference character 12. While not shown, the housing 10 includes a wiring harness for providing multiple conductors between the housing 10 and other computer equipment, also not shown. The housing 10 includes a number of slots 14 of similar rectangular shape as characterized by the disk drive unit 12. When inserted and properly connected to the electrical fixturing of the housing 10, the disk drive unit 12 can be controlled by a number of switches on the front panel 16 as shown in FIG. 1a. Shown is a start/stop switch 18 and an integral indicator lamp 20 indicating the start/stop status of the disk drive unit 12. In like manner, a write protect switch 22 is provided, along with an associated indicator lamp 24. Additional light emitting diode indicators 26, 28 and 30 indicate respectively the active, ready and locked conditions of the disk drive unit 12.

Each disk drive slot 14 also includes a pair of pins 32 and 34 protruding laterally from inner side surfaces thereof, and engageable with an insertion/removal arrangement 36 of the associated disk drive unit 12. The arrangement 36 comprises a camming slots 38 formed in side arms 42 and 44 which define a part of a lever arm utilized for effecting the insertion and withdrawal of the disk drive unit 12 from the housing 10. Each side arm 42 and 44 is connected together by a handle 46, thereby forming a U-shaped structure which is rotatably mounted to the disk drive unit 12. The camming slots 38 are spiral-shaped and formed within a plate structure 48 (FIG. 2), one of which is fixed to each respective side arm 42 and 44. The plates 48 may be bolted, welded or otherwise formed as part of the respective side arms 42 and 44. In addition, the end of each side arm 42 and 44 includes a bushing which accepts an outwardly directed bearing shaft (not shown) which is mounted to the casing of the disk drive unit 12. The shaft is rotatable within the bushing. In this manner, the handle 46 is rotatable or pivotable about the bearing shaft and bushing, rotating with it the plates 48 and associated camming slots 38.

To be discussed in more detail below, the disk drive unit 12 has fastened internal thereto an electrically operated solenoid with an armature extending therethrough. The armature is driven outwardly when the solenoid is actuated. One end of the armature is interlockingly engageable with a hole formed within one side arm 42. A sensor is fixed to the other end of the armature for sensing when the solenoid armature is extended and fully engaged and interlocked within the side arm hole.

Figure 2:
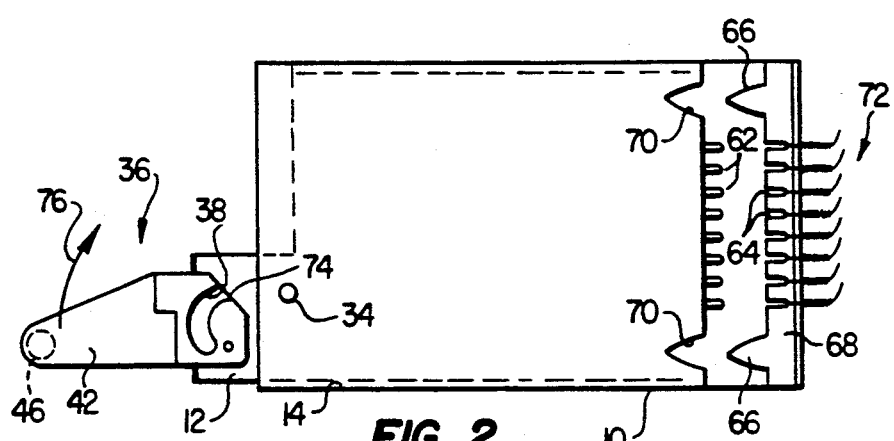
FIG. 2 is a side sectional view of the connectorized disk drive and housing electrical apparatus, shown just before engagement of the parts thereof.

Referring now to FIG. 2, there is shown a partially sectioned side view illustrating the manner in which the spiral camming slot 38 cooperates with the pin 34 to effect the insertion of the disk drive unit 12 within the housing 10 and thereby fully seat the electrical connector pins 62 within mating connector sockets, such as shown by reference character 64. In order to accurately align each pin 62 with a corresponding socket 64, a number of conical shaped male elements 66 are formed integral with a backplane connector 68. A number of similarly spaced and shaped conical female elements 70 are formed within the backside of the disk drive unit 12 so that when inserted, it becomes accurately aligned with the back plane connector 68 before the pins 62 begin mating with the corresponding sockets 64. With this the possibility of misalignment between pins 62 and sockets 64 is minimized, as is the potential damage to either such electrical connector part. As is customary, pins extending from the backplane be wired to form a harness 72 for communicating electrical signals between the computerized equipment and the disk drive unit 12.

The insertion pins 34 extending from the disk slots 14 are affixed to the housing 10 in such a location such that when the disk drive unit 12 is insert housing 10, the mouth or opening 74 of the camming 38 receives therein the pin 34. Once the pin 34 the camming slot 38, the handle 46 can be manually rotated upwardly, such as shown by arrow 76. The upward rotation of the handle 46 causes the pin 34 to move with respect to the camming slot 38, thereby forcing the disk drive unit 12 further into the housing 10. The pin 34 bottoms out in the camming slot 38 when connector pins 62 are fully seated within the back connector sockets 64. Not only does the camming action between the slot 38 and pin 34 provide a uniform and controlled inward movement of the disk drive unit 12, but when the handle 46 is locked in an upward position, removal of the disk drive unit 12 from the housing 10 is prevented.

Figure 3:
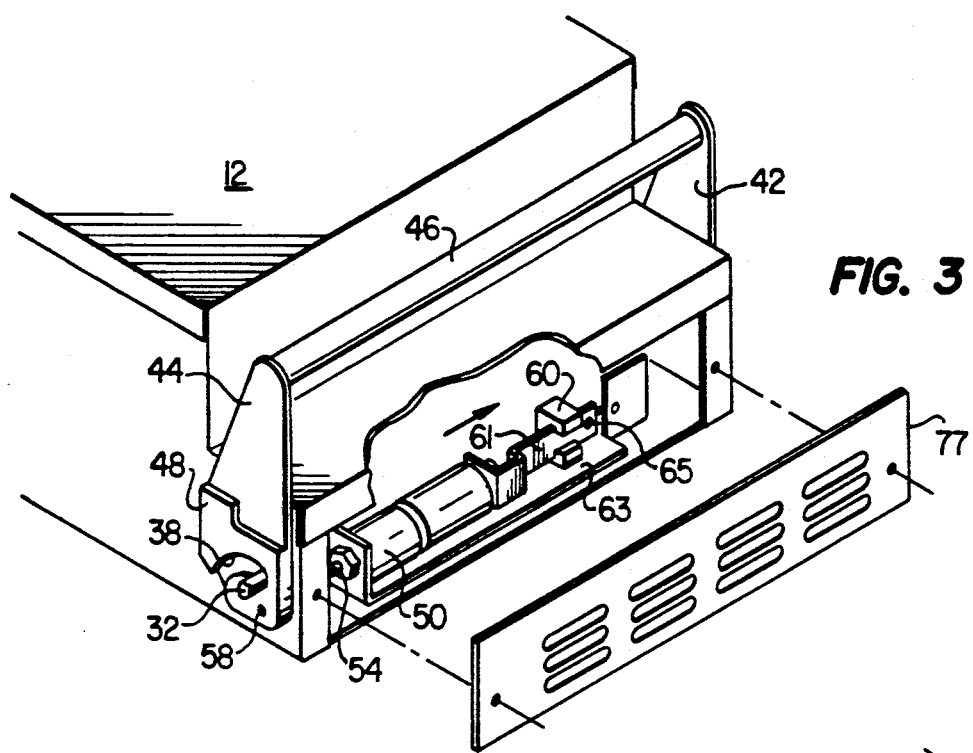
FIG. 3 is an isometric view of a frontal portion of the disk drive unit of the invention, illustrating the major components of the insertion, locking and sensing arrangement.

FIG. 3 illustrates the disk drive unit with a frontal panel 77 removed, but otherwise as it would appear in such a locked position within the housing 10. As can be appreciated, the handle 46 is shown after it has been upwardly to insert the disk drive unit 12 into the housing 10. When the handle 46 is in the fully locked position, the housing pin 32 is bottomed out within the spiral camming slot 38. The disk drive unit 12 cannot then be moved with respect to the housing 10, except by the reverse pivotal movement of the handle 46. Moreover, downward or reverse pivotal movement of the handle 46 causes an edge of the camming slot 38 to bear upon the pin 32 and force the unit 12 outwardly from the housing 10.

In accordance with an important feature of the invention, the solenoid 50 is electrically actuable when the handle 46 is in a position rotated fully upwardly, with the disk drive unit 12 fully inserted within the housing 10. When actuated, the solenoid 50 drives the armature 54 outwardly, interlocking within a hole 58 formed within the side arm 42 of the handle 46. As shown, the hole can extend through a sidewall of the housing of the disk drive unit, as well as in the camming plate 48. Because the solenoid 50 is fixed adjacent to the frontal faceplate of the disk drive unit 12, the handle 46, interlocked with the solenoid 50, becomes locked and is prevented from rotating until proper precautions or steps have been taken to effect the correct removal of the disk drive unit 12. Such a procedure will be described in more detail below. The single armature solenoid 50 is of conventional design. In the preferred form of the invention, the solenoid 50 is identified as Model No. 53761-81, manufactured by Deltrol. Such a solenoid includes an armature that extends entirely through the solenoid. Those skilled in the art may prefer to utilize a double armature solenoid, or a pair of solenoids, each engageable with respective holes in both of the handle side arms.

As yet other alternatives, the handle 46, side arms 42 and 44 and associated camming plates 40 and 48 could be pivotally mounted within the disk drive slots 14 of the housing 10, with the pins 32 and 34 mounted on the opposing outer sidewalls of the disk drive unit 12.

In accordance with another feature of the invention, a sensor 60 is mounted in the path of the solenoid armature movement to detect when the solenoid has been actuated to the extent that the armature 54 protrudes through the respective hole 58 to thereby lock the handle 46 in an upward position. The sensor 60 is fixed to the frame structure of the disk drive unit 12, and is of the type having a gap for receiving therein a vane 61 which is fixed to an end of the armature opposite that of end 54. Preferably, the sensor 60 is mounted to a bracket 63 which also provides a base to which the solenoid 50 is fixed. Significantly, the armature vane 61 includes a hole 65 through which light can pass for detection by the sensor 60 to determine the longitudinal position of the solenoid armature 54. When the solenoid is activated the armature end 54 is extended into engagement with the side arm hole 58, whereby the vane hole 65 provides a passageway for light between a light source and receiver within the sensor 60. When the solenoid 50 is deactivated, the armature is retracted by an internal spring and the vane 61 blocks the transmission of light within the sensor 60. The light receiver within the sensor is typically a photoconductive element which provides an output resistivity indicative of the state of the solenoid actuation. Those skilled in the art can readily develop circuits coupled to the sensor 60 for providing an electrical signal signifying the activation or deactivation of the solenoid 50. As can be appreciated, when the vane 61 of the armature 54 extends into the sensor 60, such a condition is detected and transferred by electrical signals to the disk drive unit 12, then through connector pins 62 and sockets 64 to other circuits in the housing 10.

The sensor 60 can be of the optical type noted above having a light transmitter and receiver which, when a light beam remains uninterrupted by the vane 61, an electrical signal is provided as an indication of the solenoid armature 54 being interlocked with the side arm 42. An optical type sensor suitable for use with the invention is identified as Model No. OPB980P55, manufactured by TRW. The sensor 60 can also be of the magnetic type in which the proximity of the solenoid armature 54 is detected. In this event, the solenoid armature 54 is required to be of a particular material which is sensitive to detection by magnetic techniques.

Figure 4:
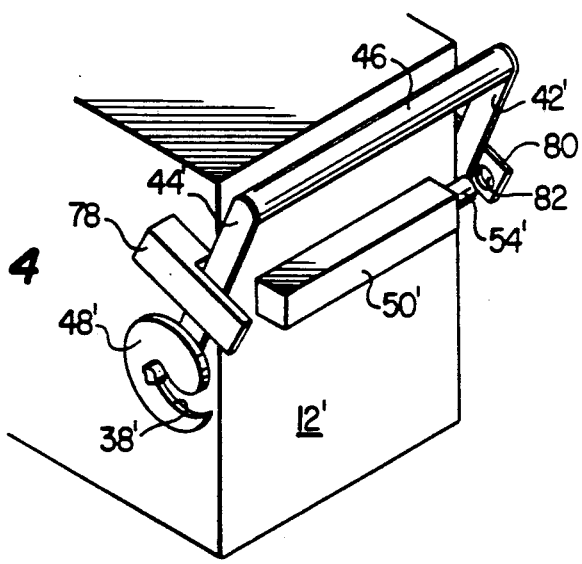
FIG. 4 illustrates another embodiment of the insertion/removal and locking arrangement of the invention.

FIG. 4 shows an alternative interlock arrangement for assuring that the disk drive unit 12' cannot be removed from its housing until special precautions have been taken. The alternative arrangement comprises a pair of apertured brackets 78 and 80 fixed on opposing sides of the unit 12'. Each bracket includes an aperture, one shown as reference character 82, for receiving therein the respective armature 54' of the solenoid 50'. Fabricated within one bracket 78 or 80 is an optical or magnetic sensor such as described above. Hence, when the handle 46' is rotated upwardly, and when the armature 54 is fully engaged within the aperture of the bracket 80, the handle 46' becomes captured and prevented from downward rotation. As can be seen, the handle 46' is captured by shouldered portions of the brackets 78 and 80 to prevent further upward movement thereof, and captured by the armature 54' to prevent downward movement of the handle 46'.

Figure 5:
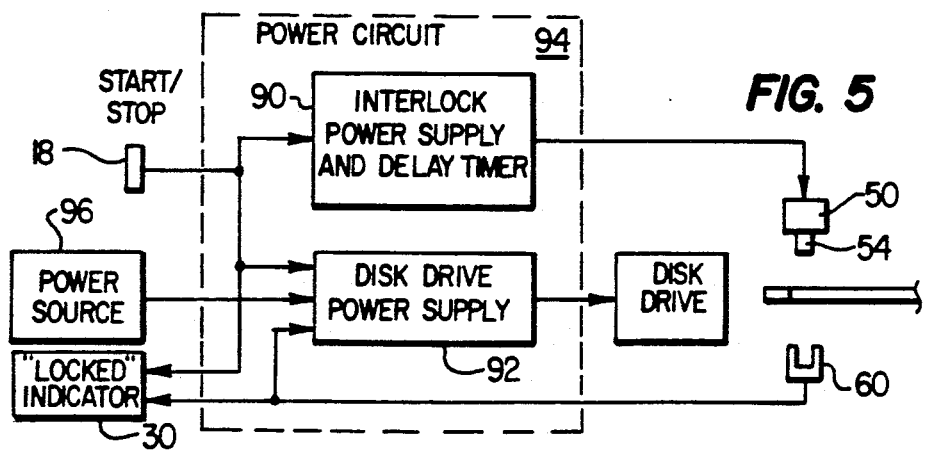
FIG. 5 is an electrical block diagram illustrating the functions of the electrical circuits which are operable to control the invention in a fail-safe manner.

The electrical functions of control circuits within the housing 10 are shown in block form in FIG. 5. Shown is a start/stop switch 18 connected to an interlock power supply and delay timer 90, and a disk drive power supply 92, both such circuits defining a power circuit 94. The interlock power supply and delay timer circuit 90 is connected to the solenoid interlock 50. Solenoid 50 is shown as a single armature type, although a double armature would function no differently in an electrical manner. A power source 96 supplies the primary power to the disk drive power supply 92. The power source 96 may be a regulated or unregulated voltage from which the disk drive power supply 92 generates one or more other voltages necessary to operate the disk drive unit 12. An indicator 30, preferably of the LED type, is connected to the optical sensor 60, as well as to the start/stop switch 18.

Insertion of the unit 12 and the corresponding electrical operation of the invention is accomplished as follows. The disk drive unit 12 is first inserted within the housing 10 until the pins 32 and 34 become engaged within the corresponding camming slots 38. The handle 46 is then rotated upwardly so that such unit 12 is fully inserted within the housing 10, with the connector pins 62 fully mated with the connector sockets 64. Next, the start/stop switch 18 is depressed to thereby generate an electrical signal to the interlock power supply and delay timer 90. Such a signal is also coupled to the disk drive power supply 92. The interlock power supply and delay timer 90, in turn, supplies power to the winding of the solenoid 50, thereby driving the armature 54 outwardly. The optical sensor 60 detects if there has been a successful engagement of the solenoid armature 54, through the hole 58 within the handle side arms, and into the sensor 60 itself. Upon successful interlocking engagement, the sensor 60 generates a signal to illuminate the "locked" indicator 30, which signal also enables the disk drive power supply 92 to commence supplying power to the disk drive unit 12. Importantly, only when the sensor 60 generates a signal does the disk drive power supply 92 supply power to the disk drive unit 12. Those skilled in the art can readily devise circuits which are adapted for controlling the disk drive power supply 92 in response to external signals, such as that generated by the optical sensor 60.

If, on the other hand, the start/stop switch 18 has been pushed in order to start the disk drive unit 12, and if the sensor 60 does not detect the engagement of the solenoid armature 54 interlocked with the side arm 42, the indicator 30 will begin blinking at a steady rate to indicate an error condition. Hence, if the optical sensor 60 detects the interlocked solenoid armature 54, the indicators 20 and 30 are illuminated, but if the armature 54 is not detected, the indicator 30 flashes, and indicator 20 remains extinguished to signify to an operator that the handle 46 is not in the proper position for operation of the disk drive unit 12. If the start/stop switch 18 has been pushed with no disk drive unit 12 installed, indicators 20 and 30 remain extinguished.

The steps to be undertaken in removing the disk drive unit 12 from the housing 10 are carried out as follows. First, the start/stop switch 18 is depressed in order to power down the disk drive unit 12. In response to the depression of the switch 18, power is removed from the disk drive unit 12. Concurrently, a timer in delay circuit 90 is started such that power continues to be supplied to the solenoid 50 for a predetermined period of time. In the preferred form of the invention, the interlock power supply and delay timer 90 supplies power to the winding of the solenoid 50 for about 40 seconds, even though the stop switch 18 has been depressed. The delay time is calculated to be sufficient for the high speed rotating disk within the disk drive unit 12 to stop and the read/write head associated therewith to move to an initial position. During the 40 second delay the start/stop lamp 20 flashes to inform the user to wait. The flashing denotes the 40 second timer is running. After the delay time, power is removed from the solenoid 50, whereupon the armature 54 is retracted by springs internal to the solenoid 50. The optical sensor 60 detects whether or not the solenoid armature has indeed been retracted. If armature retraction has been achieved, no further action is taken by the power circuit 94, except the "locked" lamp 30 is extinguished. However, if the armature 54 of the solenoid 50 has not fully retracted, the "locked" indicator 30 begins to flash to indicate an error condition. The error condition indicates to an operator that further intervention is required in order to properly remove the disk drive unit 12 from the housing 10.

The interlock power supply and delay timer 90 comprises a supply voltage suitable for powering the winding of the solenoid 50, and a circuit for controlling the application of such power to the solenoid 50. The delay timer can comprise an integrated circuit and suitable components for providing the requisite delay after the depression of the stop switch 18. A 74LS123 integrated circuit with a large capacitor and a large resistor are suitable for use as the delay element.

From the foregoing, disclosed is a fail-safe interlock arrangement for rendering a portable disk drive unit less susceptible to damage during insertion or removal from housing fixtures. The interlock system of the invention is characterized by a handle which is rotatably fixed to the disk drive unit and pivotable between a first position and second position to effect the insertion or withdrawal of the unit from a housing fixture. A camming slot and pins are responsive to the pivotal movement of the handle to achieve an orderly insertion or withdrawal of the unit from the electrical connectors of the housing fixture. When the handle is fully rotated in one direction for insertion of the unit, and when a disk drive unit start switch is depressed, a solenoid is activated to drive a plunger outwardly for locking the handle in such position, thereby preventing removal of the disk drive unit. A sensor is operative to sense when the solenoid armature is interlockingly engaged with the handle so that safe operation of the unit can commence.

When it is desired to remove the disk drive unit from the housing, the conventional stop switch is depressed, and a time delay is interposed before the solenoid is deactivated. The time delay is related to the time to place the disk drive in a fully stopped condition so that the unit cannot be prematurely withdrawn and possibly damaged. Again, the sensor senses when the solenoid armature is finally retracted so that the unit can be withdrawn without risk of damage to the electrical or mechanical apparatus thereof.

While a preferred and alternative embodiments of the invention have been disclosed with reference to specific interlocking arrangements and methods, it is to be understood that many changes in detail may be made as a matter of engineering choices without departing from the spirit and scope of the invention, as defined by the appended claims.

What is claimed is:

1. An interlocking arrangement for use in removal and insertion of a disk drive unit with respect to a housing fixture, comprising:

a disk drive housed in said unit;
   a handle rotatably fastened to said disk drive unit;
   an insertion and removal mechanism responsive to rotation of said handle to one position for effecting insertion of said disk drive unit in said housing, and responsive to rotation to another position for effecting removal of said disk drive unit from said housing;
   a switch for applying and removing power from said disk drive unit; and
   a lock responsive to the application of power to said disk drive for locking said handle in said one position to prevent rotation of said handle and the corresponding removal of said disk drive unit from said housing, and responsive to the removal of power from said disk drive for unlocking said handle and allowing rotation thereof to said other position to allow removal of the disk drive unit from said housing.

2. An interlocking arrangement for use in removal and insertion of a disk drive unit with respect to a housing fixture, comprising:

a disk drive housed in said unit;
   a handle rotatably fastened to said disk drive unit;
   an insertion and removal mechanism responsive to rotation of said handle to one position for effecting insertion of said disk drive unit in said housing, and responsive to rotation in another position for effecting removal of said disk drive unit from said housing;
   a switch for applying and removing power from said disk drive unit; and
   a lock comprising a solenoid with an armature, said lock being responsive to the application of power to said disk drive for locking said handle in said one position by engagement of the armature therewith to prevent rotation of said handle and the corresponding removal of said disk drive unit from said housing, and responsive to the removal of power from said disk drive for unlocking said handle by disengagement of the armature therewith and allowing rotation thereof to said other position to allow removal of the disk drive unit from said housing.

3. The interlocking arrangement of claim 2, wherein said solenoid is fixed to said disk drive unit, and said armature is movable outwardly for engaging said handle.

4. The interlocking arrangement of claim 3, wherein said handle includes an aperture for receiving said armature to prevent rotational movement of said handle.

5. The interlocking arrangement of claim 4, further including a sensor for sensing when said solenoid armature is inserted within the aperture of said handle.

6. The interlocking arrangement of claim 5, further including means responsive to said sensor for preventing application of power to said disk drive unit when said handle has been rotated to said one position for inserting the unit into the housing and when said armature has not been inserted into the aperture of said handle.

7. The interlocking arrangement of claim 5, wherein said sensor comprises an optical sensor.

8. The interlocking arrangement of claim 2, wherein said handle is U-shaped with side arms pivotably mounted on respective opposing sides of said disk drive unit, and said solenoid includes an armature for engaging a side arm of said handle.

9. The interlocking arrangement of claim 1, further including a camming arrangement comprising a pin fixed to said housing, and a camming slot fixed to said handle so that when said pin is engaged with said camming slot and said handle is rotated, said disk drive unit is moved with respect to said housing.

10. An interlocking arrangement for use in removal and insertion of a disk drive unit with respect to a housing fixture, comprising:
- a handle attached to the disk drive unit for use in inserting and removing the disk drive unit from the housing;
- an electrically actuated lock for locking the handle in a position when said disk drive unit is fully inserted within said housing; and
- a sensor for sensing when said lock is interlocked with said handle.

11. An interlocking arrangement for use in removal and insertion of a disk drive unit with respect to a housing fixture, comprising:
- a handle attached to the disk drive unit for use in inserting and removing the disk drive unit from the housing;
- an electrically actuated lock for locking the handle in a position when said disk drive unit is fully inserted within said housing;
- a sensor for sensing when said lock is interlock with said handle; and
- a circuit for preventing application of power to said disk drive unit when said sensor senses that said lock is not interlocked with said handle.

12. The interlocking arrangement of claim 11, wherein said sensor comprises an optical sensor.

13. The interlocking arrangement of claim 10, wherein said lock comprises a solenoid fixed to said disk drive unit, and including an armature which is movable outwardly for engaging and locking with said handle.

14. The interlocking arrangement of claim 10, further including a camming arrangement comprising a pin fixed to said housing, and a camming slot fixed to said handle so that when said pin is engaged with said camming slot and said handle is moved, said disk drive unit is moved with respect to said housing.

15. A method for interlocking a disk drive unit with respect to a housing, comprising the steps of:
- movably fixing a handle to said disk drive unit;
- fixing an insertion and removable mechanism with respect to said housing and said handle so as to respond to movement to one position for effecting insertion of said disk drive unit in said housing, and responsive to movement to another position for effecting removal of said disk drive unit from said housing;
- providing a switch for applying and removing power from a disk drive in said unit; and
- providing a lock responsive to the application of power to said disk drive for locking said handle in said one position to prevent movement of said handle and the corresponding removal of said disk drive unit from said housing, and responsive to the removal of power from said disk drive for unlocking said handle and allowing movement thereof to said other position to allow removal of the disk drive unit from said housing.

16. The method of claim 15, further comprising sensing when said handle is locked in said one position.

17. A method for providing a locking arrangement for use in removing and inserting a disk drive unit with respect to a housing, comprising the steps of:
- providing a handle movably mounted to the disk drive unit for use in inserting and removing the disk drive unit from the housing;
- electrically locking the handle in a position when said disk drive unit is fully inserted within the housing; and
- sensing engagement of the lock with the handle.

18. The method of claim 17, further including connecting a sensor to an electrical control circuit of the disk drive unit to control operation thereof in response to the sensing of the engagement of said lock with said handle.

19. A removable disk drive system with protection against premature removal, comprising:
- a disk drive unit having a set of connector terminals for connecting the disk drive unit to a power supply and for transferring data to and from the disk drive unit;
- a housing for receiving said disk drive unit, said housing having an insertion pin and electrical terminals for connecting to connector terminals of the disk drive unit when the disk drive unit is fully inserted into the housing;
- a pivoting lever arm connected to the disk drive unit and movable between first and second positions, said arm being adapted to receive the pin when the arm is in said first position upon insertion of the disk drive unit into the housing and to secure the disk drive unit within the housing upon pivoting the arm to said second position so that the arm engages said pin;
- an electrically actuated mechanical interlock mounted on the disk drive unit for locking the pivoting lever arm at said second position;
- a power control circuit connected through the connector terminals to the disk drive unit and to said interlock for selectively applying power to the disk drive unit and to the interlock, said control circuit having a disk drive power supply, an interlock power supply, and an on/off switch;
- a sensor for sensing when the interlock has properly locked the pivoting lever arm at the second position, said sensor being connected to the power control circuit for enabling the disk drive power supply;
- a timer circuit connected to the interlock power supply for maintaining power to the engaged interlock for a fixed period of time after the disk drive power has been switched "off"; and
- an indicator for indicating error conditions arising when the interlock has failed to engage successfully or has failed to disengage successfully.

20. The removable disk drive system of claim 19, wherein the engagement member comprises at least two pins attached to opposite walls of each housing shelf near an opening of said shelf.

21. The removable disk drive system of claim 20, wherein the pivoting lever arm comprises a handle attached to two cams, each cam rotatably attached to opposite sides of the disk drive unit and each cam having a spiraling camming slot for receiving said engagement member.

22. The removable disk drive system of claim 19, wherein the interlock comprises a solenoid-driven lock armature for locking the pivoting lever arm at the second position.

23. The removable disk drive system of claim 22 wherein the pivoting lever arm has a hole suitable for receiving said armature to secure the pivoting lever arm at the second position.

24. The removable disk drive system of claim 19, wherein the optical sensor is attached to the disk drive unit for sensing when the electrically actuated mechanical interlock has lockingly engaged the pivoting lever arm at said second position.

25. The removable disk drive system of claim 19, wherein the optical sensor is attached to the disk drive unit for sensing when the interlock has lockingly engaged the pivoting lever arm at said second position.

26. The removable disk drive system of claim 19, wherein the interlock power supply provides power to the interlock when the power control circujt is switched to an "on" condition.

27. The removable disk drive system of claim 26, wherein the disk drive power supply is adapted to provide power to the disk drive unit only when the power control circuit switch is "on" and the optical sensor indicates that the interlock has successfully engaged the pivoting lever arm at in the second position.

28. A method for securing a disk drive unit against premature removal, comprising the steps of:
rotatably fixing a lever arm to the disk drive unit in such a manner that the disk drive unit can be secured within a housing;
electrically actuating a mechanical interlock connected to the disk drive unit so that the lever arm cannot be rotated;
sensing whether the interlock has been successful in locking the lever arm;
indicating an error condition if the interlock has not successfully engaged; and
enabling a disk drive power supply if the interlock has successfully engaged.

29. A method for releasing a disk drive unit, comprising the steps of:
responding to an "off" condition of a power control circuit which supplies power to the disk drive unit;
starting a timer circuit to maintain the power supplied to the interlock for a fixed period of time;
terminating the disk drive power supply;
deactivating the interlock at the end of the timing period;
sensing whether the interlock has successfully disengaged; and
indicating an error condition if the interlock has not successfully disengaged.

* * * * *

UNITED STATES PATENT AND TRADEMARK OFFICE
CERTIFICATE OF CORRECTION

PATENT NO. : 5,077,722

DATED : December 31, 1991

INVENTOR(S) : Edward D. Geist et al.

It is certified that error appears in the above-identified patent and that said Letters Patent is hereby corrected as shown below:

Column 4, Line 5, after "this" insert therefore --construction,--.

Column 4, Line 8, after "backplane" insert therefore --can--.

Column 4, Line 11, after "The" insert therefore --mechanical--.

Column 4, Line 11, after "disk" insert therefore --drive--.

Column 4, Line 13, delete "insert" and insert therefore --inserted into--.

Column 4, Line 14, after "camming" insert therefore --slot--.

Column 4, Line 15, delete "34 the" and insert therefore --34 enters the--.

Column 4, Line 18, after "move" insert therefore --inwardly--.

Column 4, Line 22, after "back" insert therefore --plane--.

UNITED STATES PATENT AND TRADEMARK OFFICE
CERTIFICATE OF CORRECTION

PATENT NO. : 5,077,722

DATED : December 31, 1991

INVENTOR(S) : Edward D. Geist et al.

It is certified that error appears in the above-identified patent and that said Letters Patent is hereby corrected as shown below:

Column 4, Line 32, before "upwardly" insert therefore --rotated--.

Column 8, Line 27, delete "rotation in" and insert therefore --rotation to--.

Signed and Sealed this

Twenty-fifth Day of May, 1993

Attest:

MICHAEL K. KIRK

Attesting Officer

Acting Commissioner of Patents and Trademarks